United States Patent Office 3,578,583
Patented May 11, 1971

3,578,583
REFORMING PROCESS WITH PROMOTED LOW PLATINUM CONTENT CATALYST
Waldeen C. Buss, Richmond, Calif., assignor to Chevron Research Company, San Francisco, Calif.
No Drawing. Continuation-in-part of application Ser. No. 758,673, Sept. 10, 1968, which is a continuation-in-part of application Ser. No. 753,165, Aug. 16, 1968. This application Aug. 1, 1969, Ser. No. 846,971
Int. Cl. C10g 35/08; B01j 11/12
U.S. Cl. 208—138     11 Claims

ABSTRACT OF THE DISCLOSURE

Reforming a naphtha in the presence of hydrogen with a catalyst composition of a porous solid carrier and 0.01 to 0.3 weight percent platinum, 0.01 to 0.3 weight percent rhenium, and 0.001 to 0.1 weight percent iridium, and the novel supported platinum-rhenium-iridium catalyst.

CROSS-REFERENCES

This application is a continuation-in-part of application Ser. No. 758,673, filed Sept. 10, 1968, now abandoned, which is in turn a continuation-in-part of application Ser. No. 753,165, filed Aug. 16, 1968.

BACKGROUND OF THE INVENTION

Field

This invention relates to hydrocarbon reforming processes and more particularly to catalytic reforming of a naphtha fraction in the presence of a novel catalyst comprising platinum, rhenium and iridium supported on a porous solid carrier. The novel catalyst contains 0.01 to 0.3 weight percent platinum, 0.01 to 0.3 weight percent rhenium and 0.001 to 0.1 weight percent iridium in association with a porous solid carrier.

Prior art

Catalytic reforming is well known in the petroleum industry and referes to the treatment of naphtha fractions to improve the octane rating. Catalysts for successful reforming processes should possess good selectivity, that is, be able to produce high yields of high octane number gasoline products and, accordingly, low yields of light gaseous hydrocarbons or carbonaceous by-products. In addition, it is very desirable that the catalysts exhibit good yield stability; that is, the yield of $C_5^+$ gasoline product of a certain octane number should not decrease appreciably during the prolonged period of reforming. Decreases in $C_5^+$ liquid yield of only a few percent during the process represent a substantial economical loss. Another characteristic of good reforming catalysts is a low fouling rate; that is, the rate of increase in temperature necessary to maintain conversion of the feed to constant octane number gasoline product should be relatively low. Rapid fouling of the catalyst leads to early shutdown of the reforming process and subsequent regeneration of the catalyst.

Catalysts comprising platinum, for example, platinum supported on alumina, are well known and widely used for the reforming of naphthas and gasoline boiling range materials in order to produce high octane gasolines. Platinum catalysts are highly selective towards the production of high octane aromatics and highly active for the several reactions during reforming. However, platinum catalysts are also very expensive due to the high cost of platinum and will probably become even more expensive as a result of the restricted availability of the metal. Commercially available platinum catalysts generally contain from 0.3 to 0.8 weight percent platinum based on the finished catalyst.

It would be desirable to lower the amount of platinum necessary on the catalyst while increasing or at least maintaining the desirable attributes of the higher platinum content catalyst. Improvements which would permit lowering the platinum content of the catalyst, while still retaining the desirable benefits of higher platinum content catalysts, e.g., lower fouling rate, would represent a significant advance in the catalyst art.

In application Ser. No. 639,719, filed May 19, 1967, now U.S. Pat. No. 3,415,737, which is a continuation-in-part of application Ser. No. 560,166, filed June 24, 1966, now abandoned, a catalyst composition comprising platinum and rhenium in association with a carrier, for example, alumina, was disclosed as being highly useful for reforming processes. The platinum-rhenium catalytic composite has enhanced yield stability compared to a catalyst comprising platinum without rhenium. However, it has been observed that as the concentration of platinum and rhenium decreases, the yield stability of the catalyst decreases, and the fouling rate increases, as compared to platinum-rhenium catalysts of higher metal levels.

In my recent application, Ser. No. 753,165, filed Aug. 16, 1968, a catalyst comprising platinum and iridium was disclosed as exhibiting a remarkably low fouling rate as compared to a catalyst comprising platinum without iridium. The platinum-iridium catalyst has yield stability similar to that of a platinum catalyst without iridium. In general, it has been observed that as the concentration of platinum and iridium in the catalyst decreases, the fouling rate of the catalyst increases in comparison to catalytic composites comprising higher concentrations of platinum and iridium.

SUMMARY OF THE INVENTION

It has now been discovered that low levels of platinum, rhenium, and iridium, that is, from 0.01 to 0.3 weight percent platinum, 0.01 to 0.3 weight percent rhenium, and 0.001 to 0.1 weight percent iridium, supported on a porous solid carrier, result in a catalyst having unexpectedly high yield stability and low fouling rate. Thus, the low metals content platinum-rhenium-iridium catalyst has excellent yield stability, comparable to that of a low metals content platinum-rhenium catalyst without iridium. Furthermore, the low metals content platinum-rhenium-iridium catalyst has a fouling rate at least as low as a low metals content platinum-iridium catalyst without rhenium and a fouling rate lower than that of a low metals content platinum-rhenium catalyst or a low platinum content catalyst without rhenium or iridium.

Thus, the process of the present invention comprises contacting a naphtha fraction at reforming conditions in the presence of hydrogen with a catalytic composite of a porous solid carrier in association with from 0.01 to 0.3 weight percent platinum. 0.01 to 0.3 weight percent rhenium, and 0.001 to 0.1 weight percent iridium. Preferably, the porous solid carrier is an inorganic oxide, more preferably alumina.

Furthermore, the present invention comprises the novel catalytic composition of a porous solid carrier in association with from 0.01 to 0.3 weight percent platinum, 0.01 to 0.3 weight percent rhenium, and 0.001 to 0.1 weight percent iridium.

DESCRIPTION OF THE INVENTION

The porous solid carrier or support which is employed in the preparation of the catalyst of the present invention includes a large number of materials on which catalytically active amounts of platinum, rhenium and iridium can be disposed. The porous solid carrier can be, for example, silicon carbide, charcoal, or carbon. Preferably, the porous solid carrier is an inorganic oxide. A high surface area inorganic oxide carrier is particularly preferred, e.g., an inorganic oxide having a surface area of from 50–700 m.²/gm. The carrier can be a natural or a synthetically-produced inorganic oxide or combination of inorganic oxides. Typical acidic inorganic oxide supports which can be used are the naturally occurring aluminum silicates, particularly when acid treated to increase the activity, and the synthetically-produced cracking supports, such as silica-alumina, silica-zirconia, silia-alumina-zirconia, silica-magnesia, silica-alumina-magnesia, and crystalline zeolitic aluminosilicates. Generally, however, reforming processes are preferably conducted in the presence of catalysts having low cracking activity, i.e., catalysts of limited acidity. Hence, preferred carriers are in organic oxides such as magnesia and alumina, particularly high purity alumina.

A particularly preferred catalytic carrier for purposes of this invention is alumina. Any of the forms of alumina suitable as a support for reforming catalysts can be used. Furthermore, alumina can be prepared by a variety of methods satisfactory for the purposes of this invention. The preparation of alumina for use in reforming catalysts is well known in the prior art. Thus, the alumina may be prepared as alumina hydrosol, alumina hydrogel, alumina xerogel, alumina monohydrate, sintered alumina, and the like.

The novel reforming catalyst comprises the desired porous solid carrier having disposed thereon in intimate admixture catalytically active amounts of platinum, rhenium and iridium. The catalyst proposed for use in the present invention comprises platinum in amounts of from 0.01 to 0.3 weight percent and more preferably from 0.01 to 0.2 weight percent based on the finished catalyst. The concentration of rhenium in the final composition is from 0.01 to 0.3 weight percent and preferably from 0.01 to 0.2 weight percent. The iridium concentration in the finished catalyst composition is from 0.001 to 0.1 weight percent and preferably from 0.01 to 0.1 weight percent. The platinum, rhenium and iridium may exist as metals or as compounds on the finished catalyst. Reference to "platinum," "rhenium" and "iridium" is meant to include the metallic form as well as the compound form. The weight percent of the platinum, rhenium and iridium is calculated on the basis of the metal.

Although the components, platinum, rhenium, and iridium, can be intimately associated with the porous solid carrier by suitable techniques such as by ion-exchange, co-precipitation, etc., the components are usually associated with the porous solid carrier by impregnation. Furthermore, one of the components can be associated with the carrier by one procedure, e.g., ion exchange, and the other components associated with the carrier by another procedure, e.g., impregnation. As indicated, however, the components are preferably associated with the carrier by impregnation. The catalyst can be prepared either by co-impregnation of the three components or by sequential impregnation. In general, the carrier material is impregnated with an aqueous solution of a decomposable compound of the metal in sufficient concentration to provide the desired quantity of metal in the finished catalyst; the resulting mixture is then heated to remove water. Chloroplatinic acid is generally the preferred source of platinum. Other feasible platinum-containing compounds, e.g., ammonium chloroplatinates and polyammineplatinum salts, can also be used. Rhenium compounds suitable for incorporation onto the carrier include, among others, perrhenic acid and ammonium perrhenates. Iridium compounds suitable for incorporation onto the carrier include, among others, chloroiridic acid, iridium tribromide, ammonium chloroiridate, iridium trichloride, and ammonium chloroiridite.

It is contemplated in the present invention that incorporation of the components, platinum, rhenium and iridium, with the carrier can be accomplished at any particular stage of the catalyst preparation. For example, if the components are to be incorporated onto an alumina support, the incorporation may take place while the alumina is in the sol or gel form followed by precipitation of the alumina. Alternatively, a previously prepared alumina carrier can be impregnated with a water solution of the metal compounds.

Following incorporation of the carrier material with platinum, rhenium and iridium, the resulting composite is usually dried by heating at a temperature of, for example, no greater than about 500° F. and preferably at about 200° to 400° F. Thereafter the composite can be calcined at an elevated temperature, e.g., up to about 1200° F., if desired. It may be desirable to incorporate one or two components, for example, platinum and rhenium, with the carrier, followed by drying and low temperature calcination, before incorporating the other component.

The carrier containing 0.01 to 0.3 weight percent platinum, 0.01 to 0.3 weight percent rhenium, and 0.001 to 0.1 weight percent iridium is preferably heated at an elevated temperature in the presence of a reducing atmosphere. Preferably the heating is performed in the presence of hydrogen, and more preferably, dry hydrogen. In particular, it is preferred that this prereduction be accomplished at a temperature in the range of 600° F. to 1300° F. and preferably 600° F. to 1000° F.

The catalyst can be promoted for reforming by the addition of halides, particularly fluoride or chloride. Bromides are also useful for promoting the catalyst for reforming. The halides apparently provide a limited amount of acidity to the catalyst which is beneficial to most reforming operations. A catalyst promoted with halide preferably contains from 0.1 to 3 weight percent total halide content. The halides can be incorporated onto the catalyst carrier at any suitable stage of catalyst manufacture, e.g., prior to or following incorporation of the platinum, rhenium or iridium. Some halide is often incorporated onto the carrier when impregnating with the metal components; for example, impregnation with chloroplatinic acid normally results in chloride addition to the carrier. Additional halide may be incorporated onto the support simultaneously with incorporation of the metal component if so desired. In general, the halides are combined with the catalyst carrier by contacting suitable compounds such as hydrogen fluoride, ammonium fluoride, hydrogen chloride, or ammonium chloride, either in the gaseous form or in a water soluble form, with the carrier. Preferably, the halide is incorporated onto the carrier from an aqueous solution containing the halide.

The catalyst can be sulfided prior to contact with the feed in the reaction zone. Sulfiding the catalyst prior to contact with the naphtha helps reduce the production of light hydrocarbon gases during startup. The presulfiding can be done in situ or ex situ by passing a sulfur-containing gas, for example, $H_2S$, in the presence of hydrogen, over the catalyst. Other presulfiding treatments are known in the prior art. Also, it has been found that on startup a small amount of sulfur, for example, $H_2S$, or dimethyldisulfide, added to the reforming zone with the feed, helps reduce the initial hydrocracking activity of the catalyst. The sulfur can be introduced in any convenient manner and at any convenient location. It can be contained in the liquid hydrocarbon feed, the hydrogen-rich gas, a recycle liquid stream, or a recycle gas stream or any combination. Generally, during the reforming process most sulfur contained on the catalyst is stripped from the catalyst and will thus be removed from the reaction zone.

The feedstock to be employed in the reforming operation is a light hydrocarbon oil, for example, a naphtha fraction. Generally, the naphtha will boil in the range falling within the limits of from 70 to 550° F. and preferably 150 to 450° F. The feedstock can be either a straight-run naphtha or a thermally cracked or catalytically cracked naphtha or blends thereof. Preferably, the feed should be substantially free of sulfur, that is, the feed should preferably contain less than about 10 p.p.m. sulfur, more preferably less than 5 p.p.m. sulfur, and still more preferably less than 1 p.p.m. sulfur. The sulfur content is determined as weight of sulfur to weight of feed.

In the case of a feedstock which is not already low in sulfur, acceptable levels can be reached by hydrogenating the feedstock in a presaturation zone where the naphtha is contacted with a hydrogenation catalyst which is resistant to sulfur poisoning. A suitable catalyst for this hydrodesulfurization process is, for example, an alumina-containing support with a minor proportion of molybdenum oxide and cobalt oxide. Hydrodesulfurization is ordinarily conducted at a temperature of from 700 to 850° F., a pressure of from 200 to 2000 p.s.i.g., and a liquid hourly space velocity of from 1 to 5. The sulfur contained in the naphtha is converted to hydrogen sulfide which can be removed prior to reforming by suitable conventional processes.

In the case of a reforming process wherein the effluent is separated into reformed gasoline product and hydrogen-rich gas, and the hydrogen-rich gas is recycled to the gas zone, it may be desirable to pass the hydrogen-rich gas in contact with an adsorption zone, for example, a molecular sieve, to remove sulfur from the recycle stream. Also, the adsorption zone will remove water from the recycle stream. Thus, the concentration of impurities, for example, sulfur, will not be permitted to build up to significant amounts in the recycle stream. However, it is understood that it is not essential that the sulfur be scrubbed from the recycle stream.

The reforming conditions used in the present invention will depend in large measure on the feed used, whether highly aromatic, paraffinic, or naphthenic, and upon the desired octane rating of the product. The temperature in the reforming operation will generally be in the range of about 600 to 1100° F. and preferably about 700 to 1050° F. The pressure in the reforming reaction will in general lie within the range from about 25 to 1000 p.s.i.g. and preferably from about 50 to 750 p.s.i.g. The temperature and pressure can be correlated with the liquid hourly space velocity (LHSV) to favor any particularly desirable reforming reaction as, for example, aromatization or isomerization or dehydrogenation. In general, the liquid hourly space velocity will be from 0.1 to 10 and preferably from 1 to 5.

Reforming of a naphtha is accomplished by contacting the naphtha at reforming conditions and in the presence of hydrogen with the desired catalyst. Reforming generally results in the production of hydrogen. The hydrogen produced during the reforming process is generally recovered from the reaction products, and, preferably, at least part of said hydrogen is recycled to the reaction zone. Thus excess hydrogen need not necessarily be added to the reforming system. However, it is usually preferred to introduce excess hydrogen at some stage during the operation as, for example, during startup. The hydrogen can be introduced into the feed prior to contact with the catalyst or can be contacted simultaneously with the introduction of the feed to the reaction zone. Generally, the hydrogen is recirculated over the catalyst prior to contact of the feed with the catalyst. The presence of hydrogen serves to reduce the formation of coke which tends to poison the catalyst. Moreover, the presence of hydrogen can be used to favor certain reforming reactions, e.g., isomerization, or hydrocracking. Hydrogen is preferably introduced into the reforming reactor at a rate varying from about 0.5 to about 20 moles of hydrogen per mole of feed. The hydrogen can be in admixture with light gaseous hydrocarbons.

After a period of operation when the catalyst becomes deactivated by the presence of carbonaceous deposits, the catalyst can be reactivated or regenerated by passing an oxygen-containing gas, such as air, into contact with the catalyst at an elevated temperature in order to burn carbonaceous deposits from the catalyst. The method of regenerating the catalyst will depend on whether there is a fixed bed, moving bed, or fluidized bed operation. Regeneration methods and conditions are well known in the art.

The process of the present invention will be more readily understood by reference to the following examples.

Example 1

A series of catalysts comprising platinum and one or more metals (rhenium or iridium) were tested for the reforming of a naphtha feedstock. The catalysts tested were: Catalyst A comprising 0.6 weight percent platinum in association with alumina; Catalyst B comprising 0.6 weight percent platinum and 0.6 weight percent rhenium in association with alumina; Catalyst C comprising 0.6 weight percent platinum and 0.1 weight percent iridium in association with alumina; and Catalyst D comprising 0.6 weight percent platinum, 0.6 weight percent rhenium and 0.1 weight percent iridium in association with alumina. All the catalysts contained about 0.6 weight percent chloride. Catalyst A was a commercially available platinum catalyst. Catalysts B and C were prepared by impregnating Catalyst A with either perrhenic acid or chloroiridic acid. Catalyst D was prepared by impregnating Catalyst A with perrhenic acid, drying, then impregnating with chloroiridic acid. In all cases, only pore-fill volumes of impregnating solution were used.

Prior to use in the reforming test, the catalysts were dried at about 200° F. for 2 hours, calcined at 700° F. for 1 hour in flowing air and then heated in flowing hydrogen (167 milliliters [ml.] per minute per gram of catalyst) for one hour at from 900 to 950° F. During the time hydrogen was flowing in contact with the catalyst, 1.67 ml. of $H_2S$ per gram of catalyst were injected into contact with the catalyst.

The catalysts were tested for reforming of naphtha feedstock having a boiling range of 151 to 428° F. and comprising 23.4 volume percent aromatics, 36.5 volume percent paraffins, and 40.1 volume percent naphthenes. The feed was essentially sulfur-free. Reforming conditions included a pressure of 160 p.s.i.g., a liquid hourly space velocity of 4, and a hydrogen to hydrocarbon mole ratio of 4; once-through hydrogen was used. The temperature was adjusted to maintain conversion to 99 F-1 clear octane product. In order to compare the catalysts tested, the reforming process was conducted over about the same temperature span, that is, from approximately 930° F. to 990° F.

During the reforming process the yield of $C_5^+$ gasoline product was measured. The decline in yield of the gasoline product during the reforming operation was thereby determined and gives an indication of the yield stability of the catalyst. For convenience, reference will be made to the yield stability of the catalyst rather than to the yield decline, it being understood that the measured yield decline gives a good indication of the yield stability of the catalyst. The smaller the decrease in $C_5^+$ yield, the better the yield stability of the catalyst. The fouling rate of the catalyst, that is, the rate of increase in catalyst temperature in degrees Fahrenheit per hour necessary to maintain constant conversion of the feed to 99 F-1 clear octane product, was also determined. The results of the reforming tests with Catalysts A–D are reported in Table I.

TABLE I

| Catalyst, wt. percent metal | Decline in $C_5^+$ yield during run, vol. percent | Fouling rate, ° F./hr. |
| --- | --- | --- |
| A ---------------- 0.6 Pt ---------------- | 5.0 | 1.7 |
| B ---------------- 0.6 Pt, 0.6 Re ---------- | 0.0 | 1.1 |
| C ---------------- 0.6 Pt, 0.1 Ir ---------- | >3.5 | ≤0.4 |
| D ---------------- 0.6 Pt, 0.6 Re, 0.1 Ir --- | 0.0 | 0.7 |

It is noted from Table I that rhenium improves the yield stability of a platinum-containing catalyst (compare Catalyst B with Catalyst A). Iridium, however, does not improve the yield stability of a platinum catalyst but does significantly improve the fouling rate (compare Catalyst C with Catalyst A). Furthermore, the presence of rhenium and iridium at the high levels of 0.6 weight percent rhenium and 0.1 weight percent iridium with high metals content platinum catalyst (0.6 weight percent platinum) results in a catalyst having a poorer fouling rate than a catalyst comprising platinum and iridium without rhenium. Thus, the presence of rhenium actually hurts the fouling rate characteristics of the platinum-iridium catalyst at the high metal levels (compare Catalyst D with Catalyst C).

Another series of catalysts comprising platinum with rhenium or iridium or both were prepared and tested for the reforming of naphtha. The catalysts tested were: Catalyst E comprising 0.1 weight percent platinum and 0.1 weight percent rhenium, prepared by coimpregnating an alumina carrier with chloroplatinic acid and perrhenic acid; Catalyst F comprising 0.1 weight percent platinum and 0.025 weight percent iridium on alumina, prepared by coimpregnating an alumina carrier with chloroplatinic acid and chloroiridic acid; and Catalyst G comprising 0.1 weight percent platinum, 0.1 weight percent rhenium, and 0.025 weight percent iridium, prepared by coimpregnating an alumina carrier with chloroplatinic acid and chloroiridic acid, drying the catalyst at 300° F. for two hours, and then impregnating with perrhenic acid. The impregnations were accomplished using a pore-fill volume of the particular aqueous acid solutions. Enough metal compound was present in the solutions to provide the desired weight percent metal component on the finished catalyst. All the catalysts contained about 0.6 weight percent chloride.

The catalysts were dried at 200–250° F. for two hours, then calcined at 700° F. for one hour. The catalysts (Catalysts E, F and G) were heated in flowing hydrogen at 70, 16 and 140 ml./minute/gram of catalyst, respectively, at 1 atmosphere pressure for about 0.5 hour at 900° F. Thereafter, $H_2S$, in an amount of at least about 5 ml./gram of catalyst, was injected into the hydrogen stream over a three to five minute period. The flow of hydrogen was then continued at 900° F. for approximately two hours. The catalysts, after being placed in the reactor, were heated again in hydrogen at 900–950° F. for one hour.

The catalysts were tested for reforming as described above for Catalysts A through D. The feed and the reforming conditions were the same as that used above. Results are tabulated in Table II.

TABLE II

| Catalyst, wt. percent metal | | Decline in $C_5^+$ yield during run, vol. percent | Fouling rate, °F./hr. |
|---|---|---|---|
| E | 0.1 Pt, 0.1 Re | 1.0 | 1.9 |
| F | 0.1 Pt, 0.025 Ir | >4.0 | 1.7 |
| G | 0.1 Pt, 0.1 Re, 0.025 Ir | 1.0 | 1.4 |

Comparison of the results in Table II with those reported in Table I shows that the yield stability of a low metals content platinum-rhenium catalyst (Catalyst E) is somewhat inferior to that of the higher metals content platinum-rhenium catalyst (Catalyst B). Furthermore, the low metals content platinum-iridium catalyst has poor yield stability (compare Catalyst F with, e.g., Catalyst E or B). Unexpectedly, the presence of rhenium and iridium together with platinum at the low levels does not result in a catalyst of inferior fouling rate compared to a platinum-iridium catalyst without rhenium (compare Catalyst G with Catalyst F). This was not the case at the high metals content as reported in Table I. Stated another way, the addition of a low amount of rhenium (0.1 weight percent) to a low platinum-iridium content catalyst (0.1 weight percent platinum and 0.025 weight percent iridium) results in a marked improvement in the yield stability of the platinum-iridium catalyst and at the same time does not result in an increase in the fouling rate of the platinum-iridium catalyst, but in fact results in a decrease in the fouling rate. This is not the case for a catalyst containing high metal contents; for example, as seen from Table I, the addition of rhenium (0.6 weight percent) to a platinum-iridium catalyst (0.6 weight percent platinum and 0.1 weight percent iridium), while improving the yield stability, actually results in an increase in the fouling rate characteristics. Thus, it is evident that a catalyst comprising low platinum, rhenium and iridium contents in association with a porous solid carrier is unique and possesses exceptionally good yield stability and fouling rate characteristics.

Example 2

A catalyst was prepared by coimpregnating choloroplatinic acid, perrhenic acid and hydrochloric acid onto preformed alumina particles in sufficient concentration to provide the finished catalyst with 0.1 weight percent platinum and 0.1 weight percent rhenium. The chloride content of the finished catalyst was 0.9 weight percent. Another catalyst was prepared by coimpregnating preformed alumina particles with a mixture of choloroplatinic acid, perrhenic acid, choroiridic acid and hydrochloric acid in sufficient concentration to provide the finish catalyst with 0.1 weight percent platinum, 0.1 weight percent rhenium, and 0.025 weight percent iridium. The chloride content on the finished catalyst was 0.9 weight percent.

Both catalysts were dried in air at 250° F. for about 16 hours, calcined in flowing air at 900° F. for 4 hours, then heated in flowing hydrogen (100 cubic centimeter [cc.] hydrogen per minute per gram of catalyst) at 900° F. for one hour. Thereafter a hydrogen gas containing 2 percent $H_2S$ was contacted with the catalyst at a rate of 20 cc. per minute per gram of catalyst. Contact with the $H_2S$ was continued for 3 minutes. The hydrogen was again contacted with the catalyst after discontinuance of the flow of $H_2S$ for 0.5 hour at 900° F. at a rate of 100 cc. per minute per gram of catalyst.

The catalysts were tested for the reforming of the naphthal feed boiling within the range of from 150 to 430° F. and containing 25 volume percent aromatics, 38 volume percent naphthenes, and 37 volume percent paraffins. The F–1 octane rating of the feed was 65. The reforming conditions included a pressure of 125 p.s.i.g., a liquid hourly space velocity of 3, and a hydrogen to hydrocarbon mole ratio of 3, using once-through hydrogen. 100 F–1 clear octane product was produced throughout the test.

The fouling rate of the platinum-rhenium catalyst was found to be 3° F./hour whereas the fouling rate of the platinum-rhenium-iridium catalyst was only 1.7° F./hour.

The foregoing disclosure of this invention is not to be considered as limiting since many variations can be made by those skilled in the art without departing from the scope or spirit of the appended claims.

I claim:

1. A process for reforming a naphtha feed stock utilizing a catalytic composite having a low platinum content, which comprises contacting said feed stock at reforming conditions and in the presence of hydrogen with the catalytic composite comprising a porous solid carrier in association with from 0.01 to 0.2 weight percent platinum, 0.01 to 0.2 weight percent rhenium and 0.01 to 0.1 weight percent iridium.

2. The process of claim 1 wherein said feedstock contains less than about 10 p.p.m. by weight sulfur.

3. The process of claim 1 wherein said catalyst contains from 0.1 to 3 weight percent halide.

4. The process of claim 1 wherein said carrier is a porous inorganic oxide.

5. The process of claim 4 wherein said carrier is alumina.

6. A catalyst having a low platinum content, comprising a porous, solid carrier in association with 0.01 to 0.2 weight percent platinum, 0.01 to 0.2 weight percent rhenium and 0.01 to 0.1 weight percent iridium.

7. The catalyst of claim 6 wherein said carrier is a porous inorganic oxide.

8. The catalyst of claim 7 wherein said support is alumina.

9. The catalyst of claim 6 wherein halide is present in an amount of from 0.1 to 3 weight percent.

10. The process of claim 1 including, before the contacting, first:
   contacting the catalytic composite with a sulfur containing gas.

11. The catalyst of claim 6, wherein the catalyst is sulfided.

References Cited

UNITED STATES PATENTS

| | | | |
|---|---|---|---|
| 2,848,377 | 8/1958 | Webb | 208—138 |
| 2,939,847 | 6/1960 | Smith et al. | 208—439 |
| 3,415,737 | 12/1968 | Kluksdahl | 208—138 |

FOREIGN PATENTS

| | | | |
|---|---|---|---|
| 1,108,361 | 6/1961 | Germany | 208—138 |

HERBERT LEVINE, Primary Examiner

U.S. Cl. X.R.

208—139; 252—466